(12) United States Patent
Kozawa et al.

(10) Patent No.: US 7,571,641 B2
(45) Date of Patent: Aug. 11, 2009

(54) FLOW MEASURE INSTRUMENT, PASSAGE OF FLOW MEASURE AND PRODUCTION METHOD

(75) Inventors: Masayuki Kozawa, Hitachinaka (JP); Makoto Iida, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 127 days.

(21) Appl. No.: 11/760,867

(22) Filed: Jun. 11, 2007

(65) Prior Publication Data

US 2007/0295068 A1    Dec. 27, 2007

(30) Foreign Application Priority Data

Jun. 12, 2006    (JP)    ............... 2006-161766

(51) Int. Cl.
    *G01M 15/00*    (2006.01)
(52) U.S. Cl. .................................. 73/114.32
(58) Field of Classification Search .............. 73/114.31, 73/114.32, 114.33, 114.34, 114.35, 114.36, 73/114.37
See application file for complete search history.

(56) References Cited

U.S. PATENT DOCUMENTS

| | | | |
|---|---|---|---|
| 5,253,517 A | 10/1993 | Molin et al. | |
| 5,609,374 A | 3/1997 | Sawae et al. | |
| 5,628,519 A | 5/1997 | Kakehi | |
| 6,089,847 A | 7/2000 | Inoue et al. | |
| 6,645,274 B2 | 11/2003 | Rilling et al. | |
| 2003/0075827 A1 | 4/2003 | Demia et al. | |
| 2004/0011125 A1* | 1/2004 | Kozawa et al. ........... 73/204.22 |
| 2004/0060361 A1* | 4/2004 | Kozawa et al. ................ 73/753 |
| 2006/0027016 A1* | 2/2006 | Kozawa et al. ............. 73/118.2 |

FOREIGN PATENT DOCUMENTS

| | | |
|---|---|---|
| EP | 0 247 822 A2 | 12/1987 |
| EP | 1 296 121 A1 | 3/2003 |
| JP | 9-53966 A | 2/1997 |
| JP | 10-185640 A | 7/1998 |
| JP | 3245362 B2 | 10/2001 |
| JP | 2003-80575 A | 3/2003 |
| JP | 2004-318863 A | 11/2004 |
| WO | WO 01/63220 A2 | 8/2001 |

OTHER PUBLICATIONS

European Search Report dated Sep. 27, 2007 (eight (8) pages), EP 07 01 1490.
Notice of Reason for Rejection with an English translation of considerable parts dated Nov. 6, 2008 (Seven (7) pages), 2006-161766.

* cited by examiner

*Primary Examiner*—Eric S McCall
(74) *Attorney, Agent, or Firm*—Crowell & Moring LLP

(57) ABSTRACT

A laminarization lattice of thin plastic and a gate are provided in a body at respective positions so that a distance between the laminarization lattice and the gate is not less than a half of an entire length of the body, and the laminarization lattice and the body are integrally molded. That is, a configuration of the invention enables a hesitation occurring in the lattice of thin plastic to be suppressed, and a resin to be injected at single stroke of a short time to form the lattice of thin plastic.

20 Claims, 14 Drawing Sheets

AVERAGE THICKNESS OF LATTICE MESH

AVERAGE THICKNESS OF LATTICE MESH

US 7,571,641 B2

FLOW MEASURE INSTRUMENT, PASSAGE OF FLOW MEASURE AND PRODUCTION METHOD

BACKGROUND OF THE INVENTION

The present invention relates to a flow meter, passage of flow measurement and production method thereof, and more particularly, to a flow meter, passage of flow measurement and production method thereof suitable for use in measurement of a flow of air taken into an internal combustion engine of an automotive engine.

As a laminarization lattice for an air flow meter, metal mesh, aluminum honeycomb or plastic is generally used. Here, as described in Japanese Patent No. 3245362, a laminarization lattice of a thin plastic molded product is molded as a part independent of a body component. Furthermore, in order to improve moldability of the laminarization lattice portion, a laminarization lattice shape (thickness of first lattice is approximately 0.3 mm, thickness of second lattice is approximately 1 mm) or the like is publicly known, which is composed of a reticular lattice having a first thickness and spacing and a second rib lattice having a thickness and spacing greater than the first thickness and spacing with the first reticular lattice and the second rib lattice being integrally molded.

According to a conventional technique, a body component and laminarization lattice component are molded as separate parts to enable a laminarization lattice which is a thin plastic molded product having a thickness of approximately 0.3 mm to be molded. This leads to a problem that a variation in assembly of the body and the laminarization lattice causes the air flow in the vicinity of a detector for detecting the air flow to change, provoking deterioration of measurement accuracy of an air flow meter. Furthermore, there is another problem that falling of the laminarization lattice due to assembly faults or the like provokes deterioration of measurement accuracy of the air flow meter. Moreover, since the body component and the laminarization lattice component are separate parts, the number of parts tends to increase and the cost also has a tendency to increase due to an addition of assembly work. Furthermore, since the second rib lattice is made thicker to improve moldability of the lattice, there is also a problem that pressure loss of the lattice increases. Furthermore, making the rib lattice thicker to improve moldability causes the rib lattice to generate air disturbance, provoking deterioration of measurement accuracy.

Therefore, it is an issue to be addressed how to reduce degradation or deterioration of measurement accuracy of an air flow meter caused by low cost, assembly variation or assembly faults and suppress an increase in pressure loss of a lattice or deterioration of measurement accuracy of the air flow meter caused by making a rib lattice thicker to improve moldability.

It is an object of the present invention to realize a low cost, high accuracy flow meter, passage of flow measurement and production method thereof by integrally molding a passage and a lattice and reducing the number of parts.

BRIEF SUMMARY OF THE INVENTION

The present invention is implemented by the inventions described in claims. For example, the present invention is implemented by a flow meter, wherein a passage body and a lattice are integrally molded through injection molding of resin and an injection gate of the injection molding is provided at a distance of L/2 or more from an inlet or an exit of the passage body where L is the length of the passage in an axial direction and an average thickness of the lattice is not less than 0.3 mm and not more than 0.6 mm.

According to the present invention, it is possible to realize a low cost, high accuracy flow meter, passage of flow measurement and production method thereof by integrally molding a passage and lattice and reducing the number of parts.

Other objects, features and advantages of the invention will become apparent from the following description of the embodiments of the invention taken in conjunction with the accompanying drawings.

DETAILED DESCRIPTION OF THE INVENTION

With reference now to the attached drawings, embodiments of the present invention will be explained below.

Embodiment 1

Figure 1:
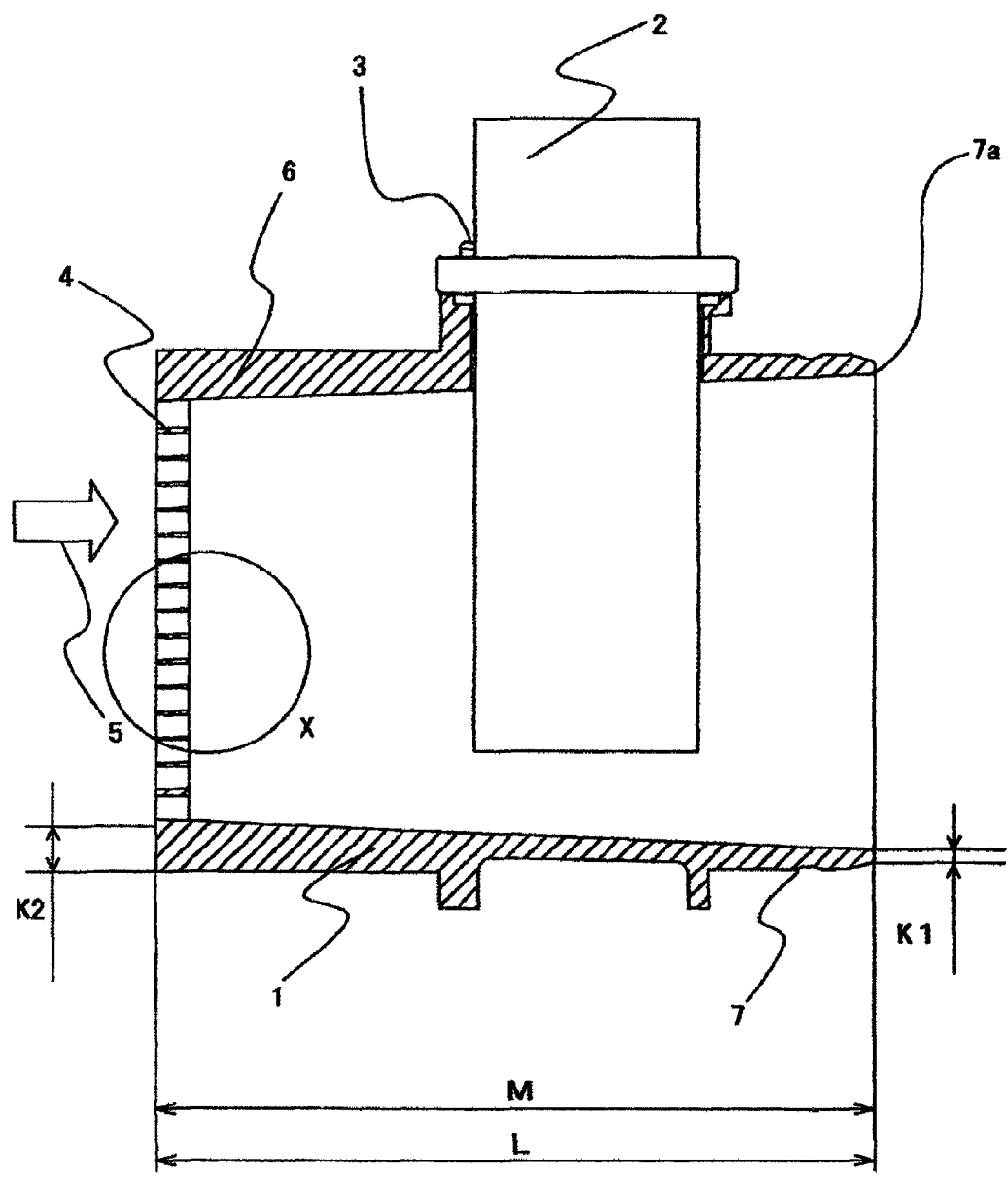
FIG. 1 is an I-I cross-sectional view of an air flow meter showing an embodiment of the present invention in FIG. 2.
Figure 2:
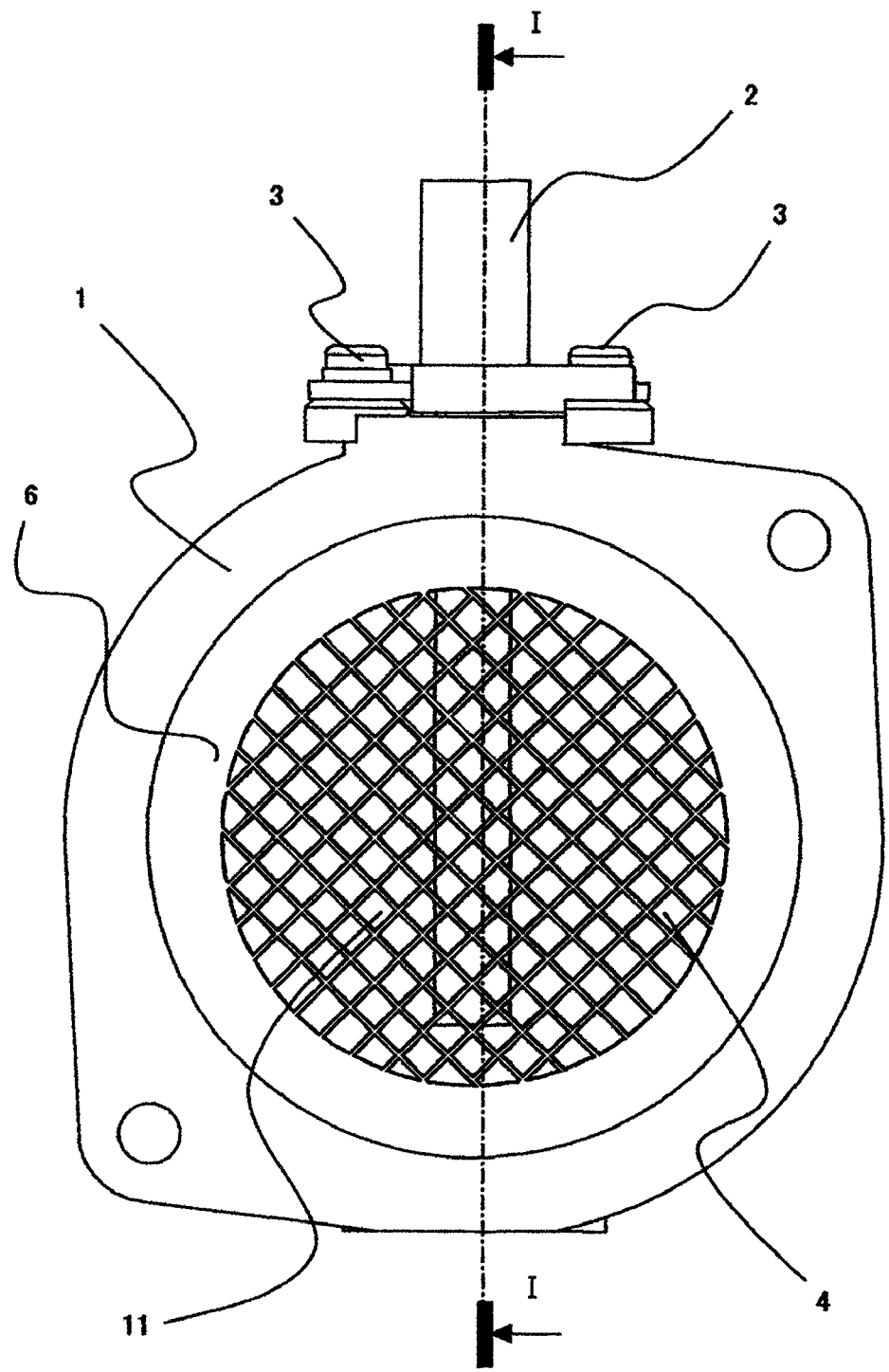
FIG. 2 is a top view viewed from upstream of the air flow in FIG. 1.
Figure 3:
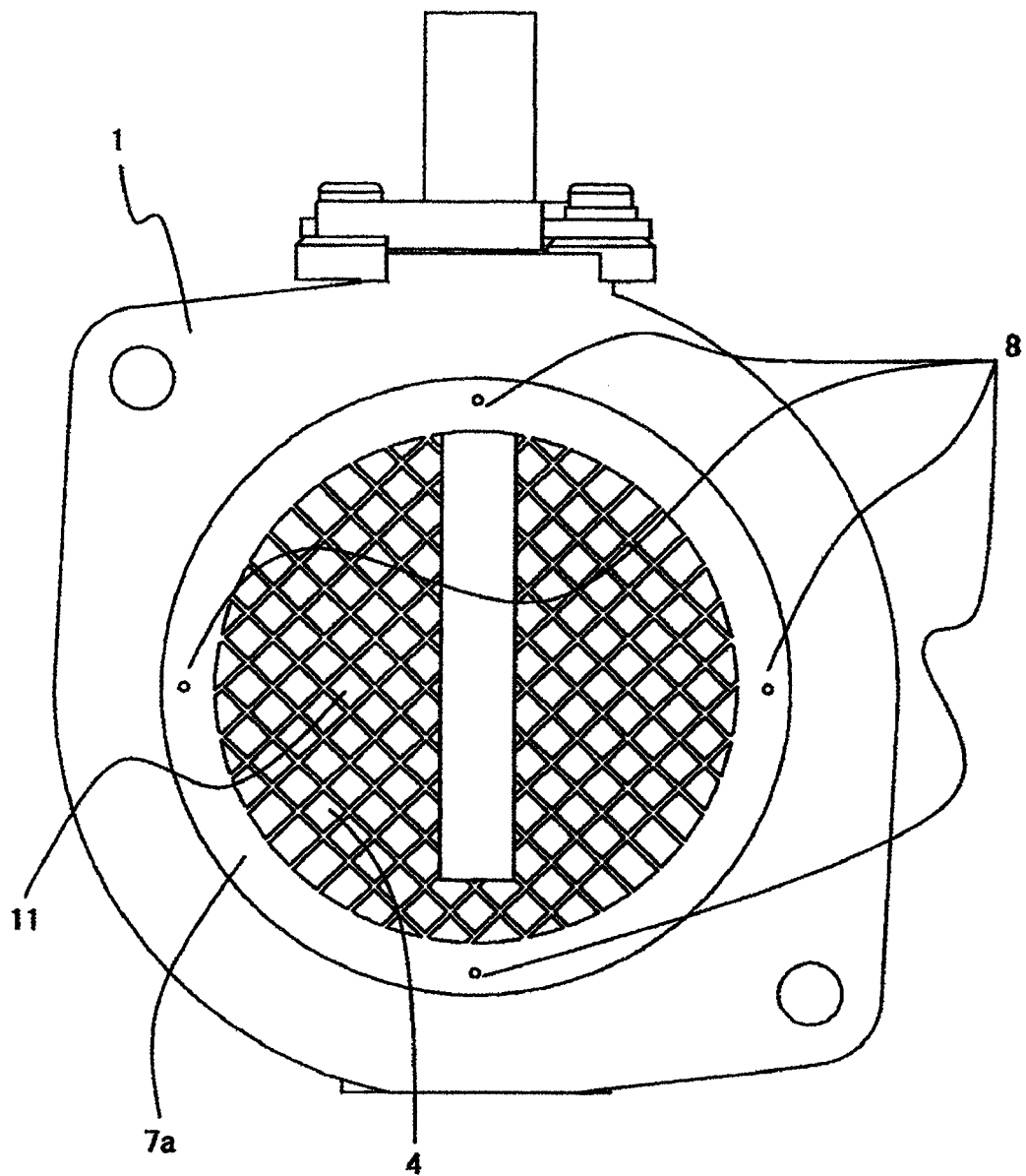
FIG. 3 is a bottom view viewed from downstream of the air flow in FIG. 1.
Figure 4:
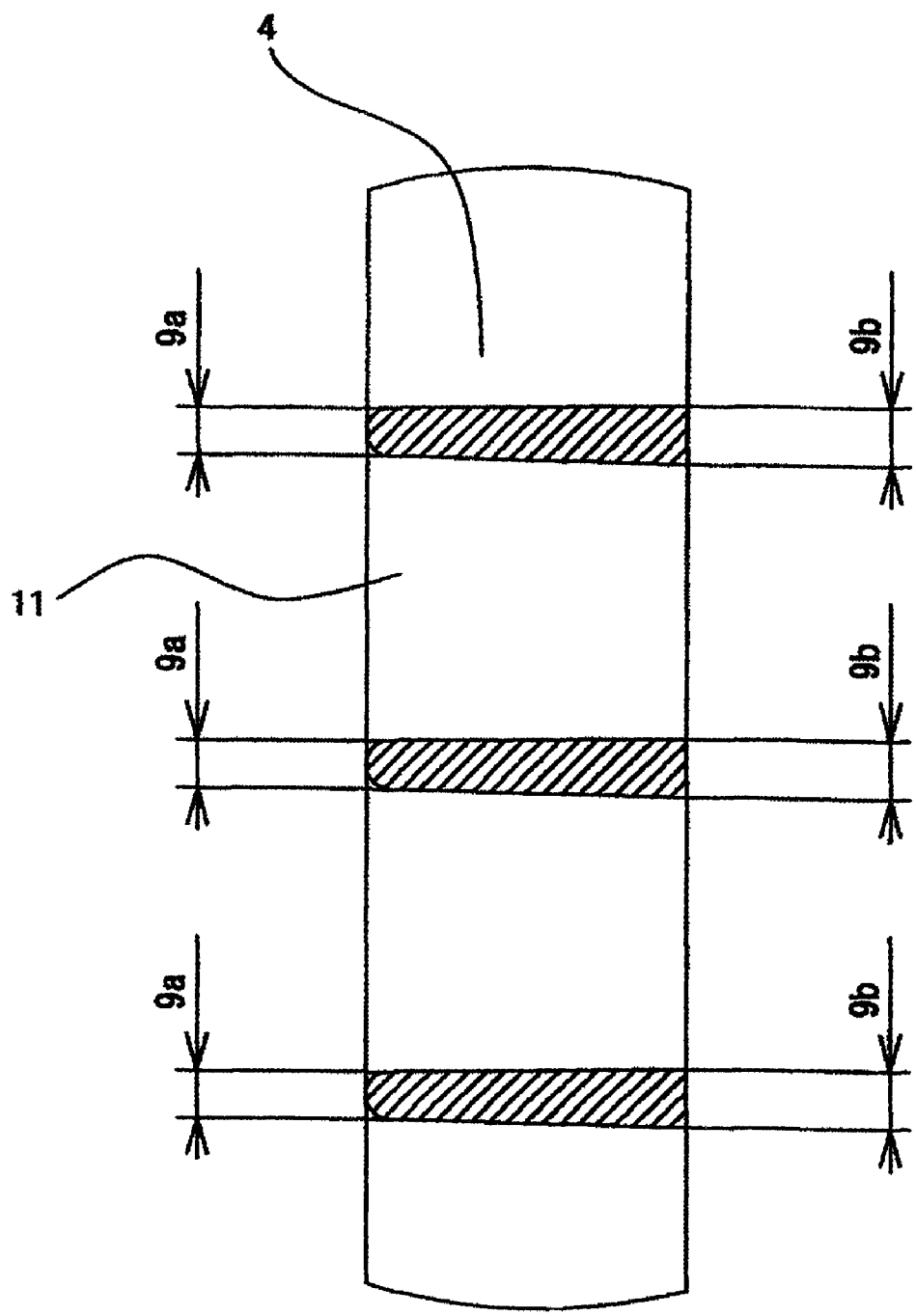
FIG. 4 is an enlarged view of X in FIG. 1.
Figure 5:
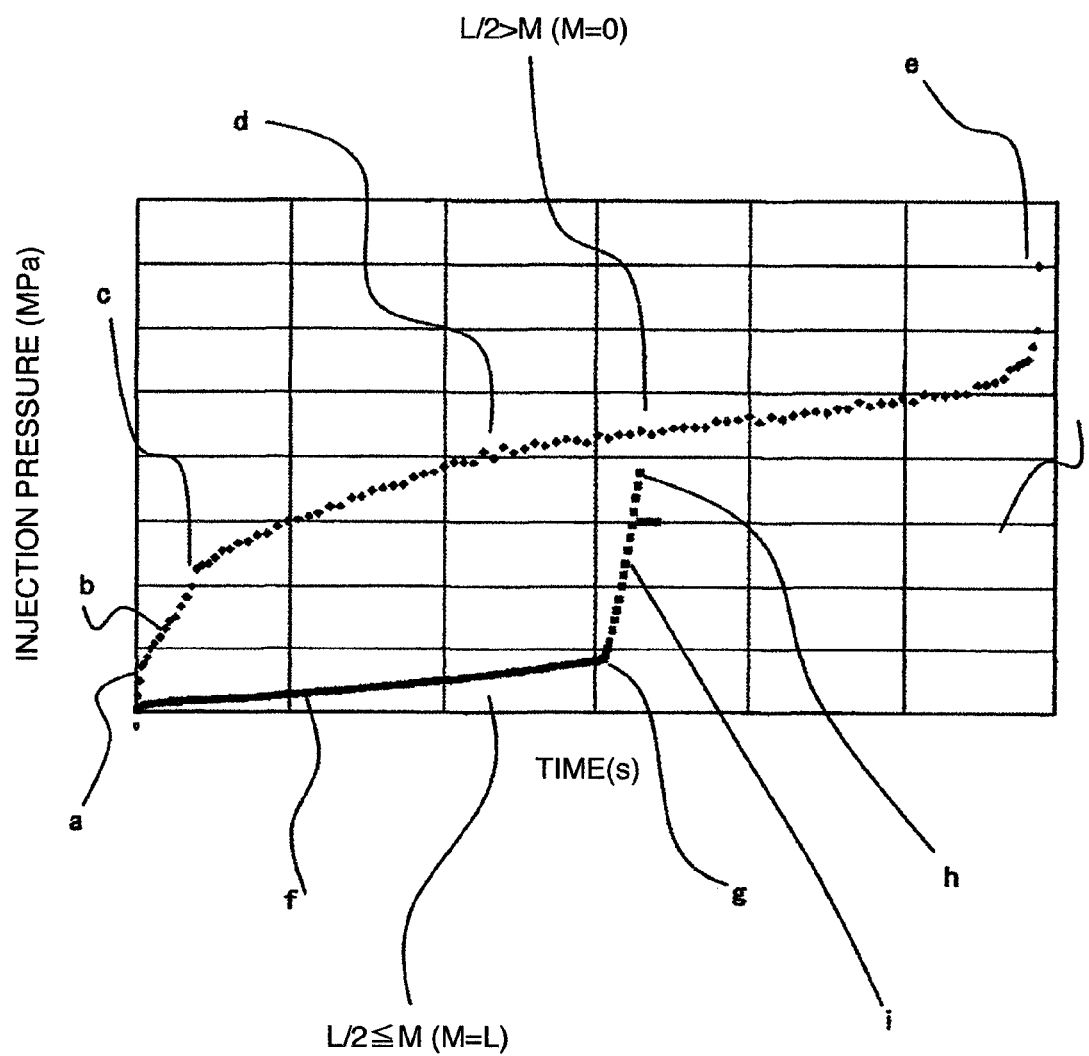
FIG. 5 illustrates a relationship between an injection pressure and time due to a difference in positions between the lattice and gate showing the embodiment of the present invention.
Figure 6:
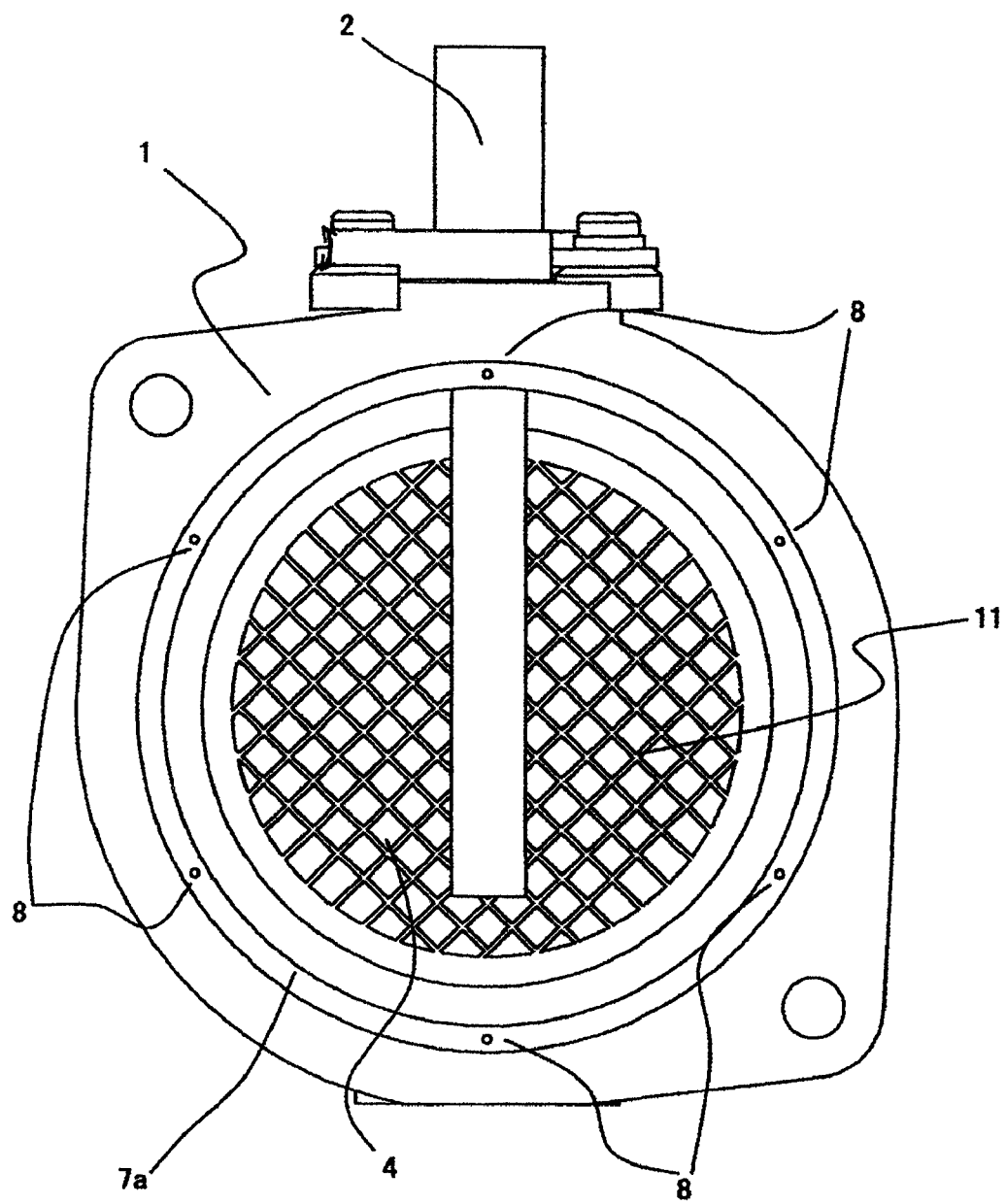
FIG. 6 is a bottom view showing a relationship between the positions of the lattice and gate viewed from downstream of the air flow shown in FIG. 5.
Figure 7:
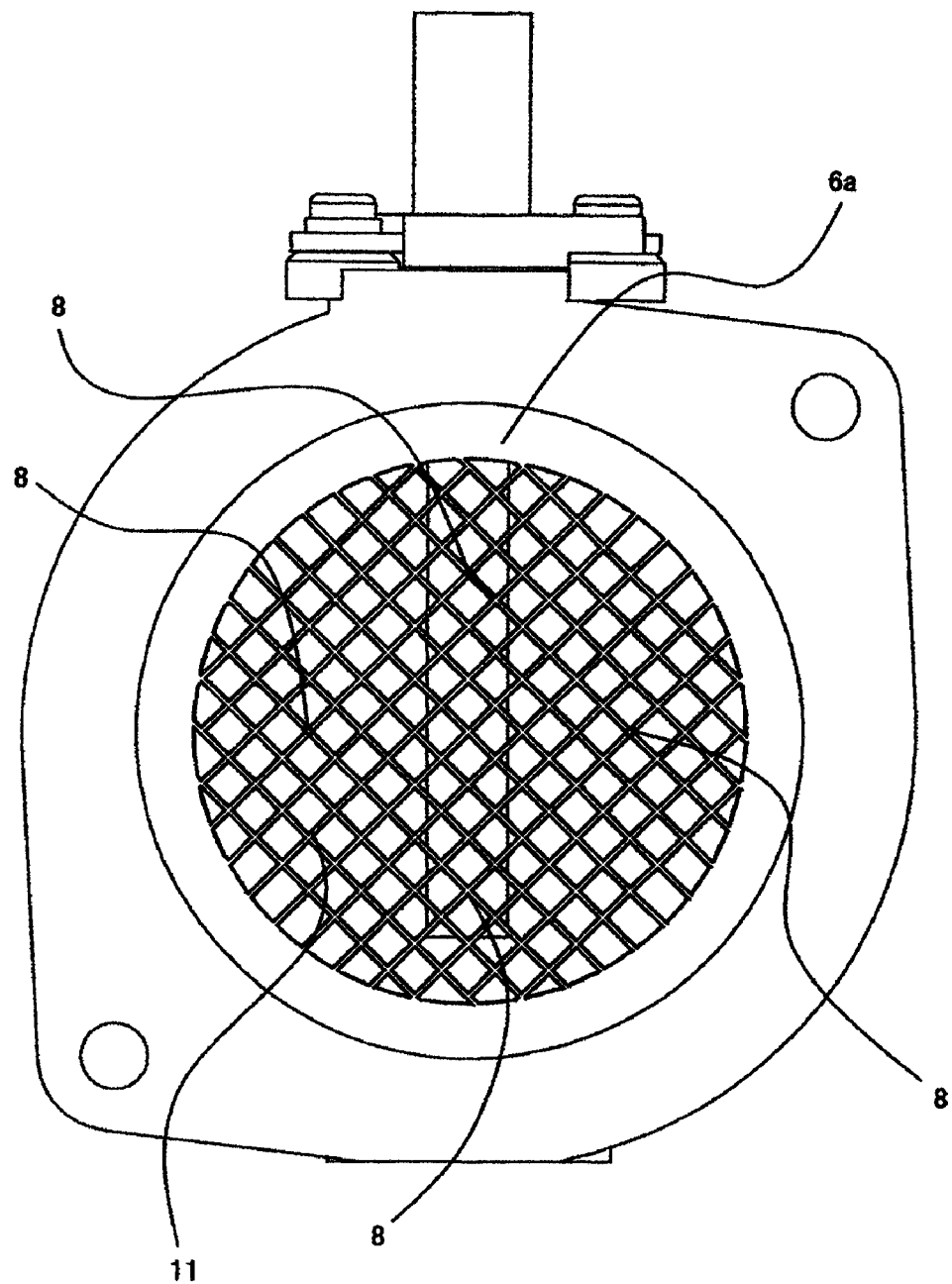
FIG. 7 is a top view showing a relationship between the positions of the lattice and gate viewed from upstream of the air flow shown in FIG. 5.
Figure 8:
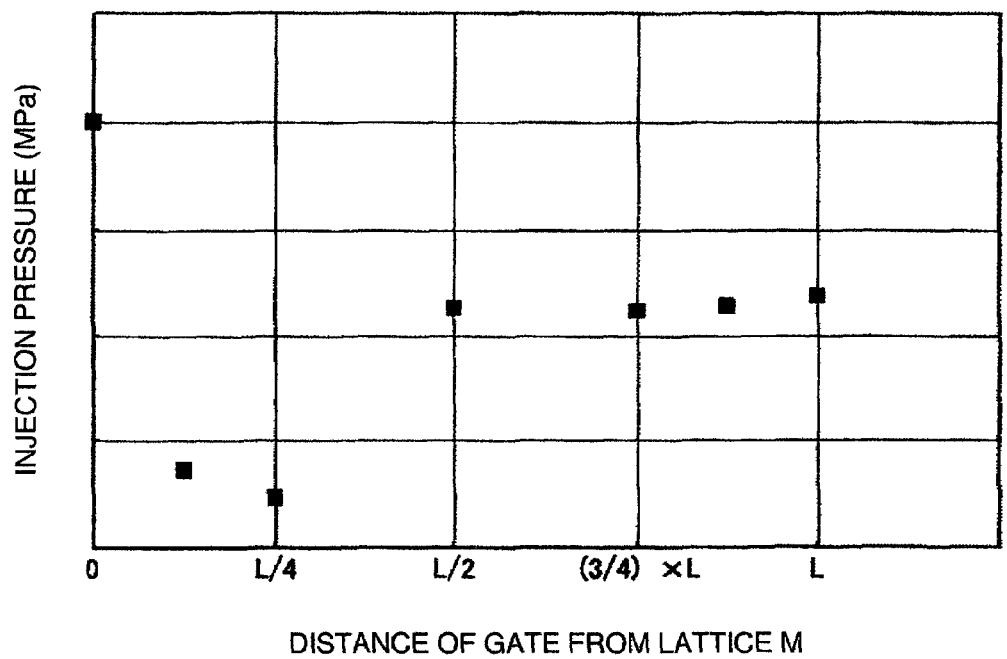
FIG. 8 illustrates a relationship between the positions of the lattice and gate and an injection pressure showing the embodiment of the present invention.
Figure 9:
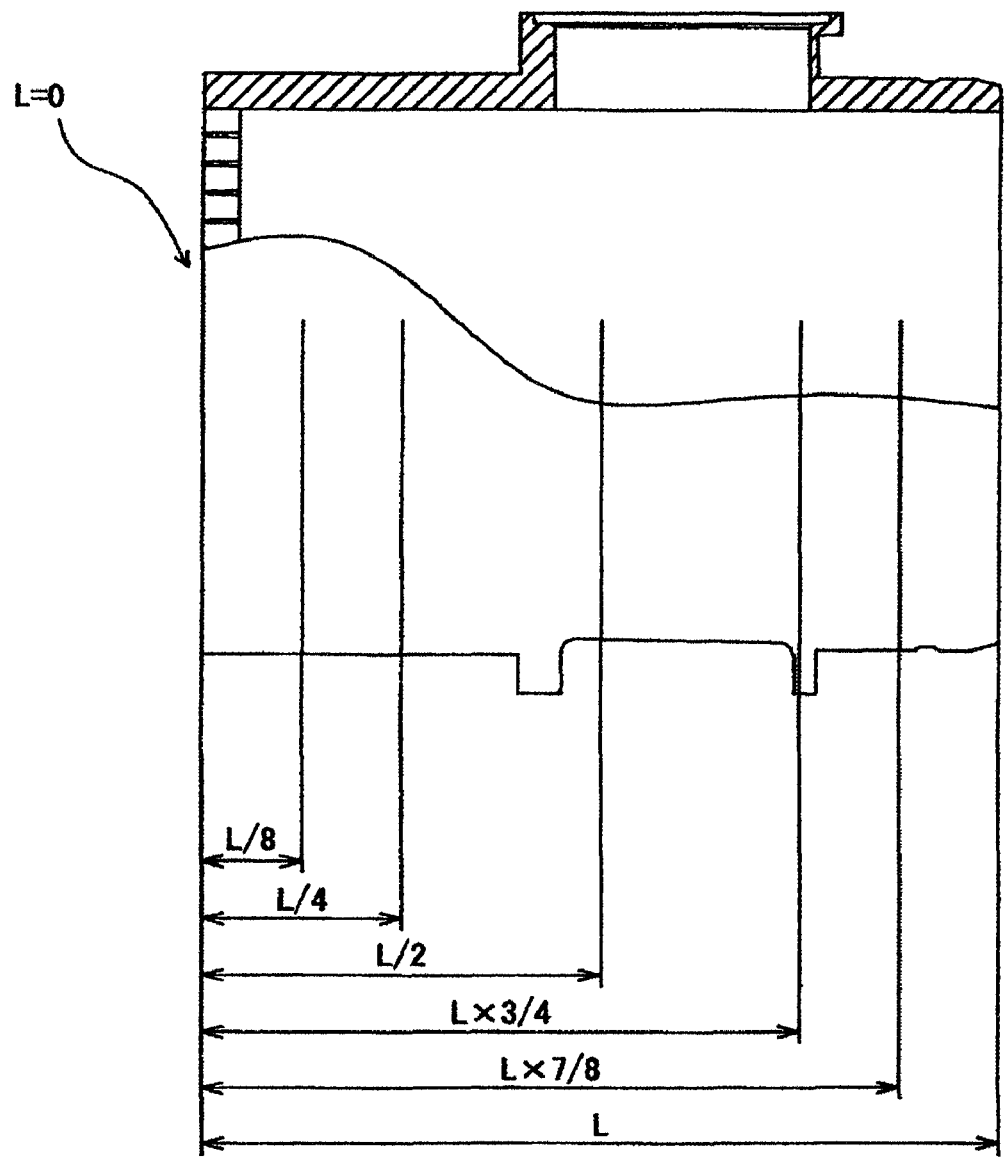
FIG. 9 is a side view of the air flow meter showing the relationship between the positions of the lattice and gate shown in FIG. 8.

FIG. 1 shows an I-I cross-sectional view of an air flow meter showing an embodiment of the present invention in FIG. 2. FIG. 2 is a top view viewed from upstream of the air flow in FIG. 1. FIG. 3 is a bottom view viewed from downstream of the air flow in FIG. 1. FIG. 4 shows an enlarged view of X in FIG. 1. FIG. 5 shows results of a time variation of an injection pressure because of differences in gate positions showing one operation and effect of the present invention. FIG. 6 shows the position of the gate provided on an end face on the downstream side showing an embodiment of the present invention shown in the result in FIG. 5. FIG. 7 shows the position of the gate provided on an end face of the laminarization lattice shown in the result in FIG. 5. FIG. 8 shows results showing the gate position and injection pressure showing one operation and effect of the present invention. FIG. 9 shows the gate positions showing the result of FIG. 8. Here, the gate 8 indicates the track of a gate (opening) used to inject resin provided in a molding die used at the time of injection molding. The gate 8 normally shows a situation in which remaining resin is cut.

The air flow meter is constructed of a circular body 1 which forms a main passage of an intake air flow and a module 2 which forms an auxiliary passage, introduces part of a gas to be measured from an inlet and measures the flow rate using a flow sensing element mounted therein, and the body 1 and the module 2 are fixed by a screw 3.

This embodiment uses a circular shape for the body 1, but the shape is not limited to the circular shape and adopting an ellipsoidal shape also produces similar operations and effects. Furthermore, the screw 3 is used to fix the body 1 and the module 2, but similar operations and effects can be obtained even when the body 1 and the module 2 are fixed by means of, for example, welding or adhesion instead of the screw.

A lattice 4 is disposed inside the body 1 upstream of the module 2 with respect to an air flow 5 so as to be substantially perpendicular to the air flow 5 and the lattice 4 is arranged at an end 6a upstream of an upstream duct 6 of the body 1 and the lattice 4 and the body 1 are integrally molded using plastic, for example, polybutylene terephthalate containing glass fibers. Gates 8 are provided on an end face 7a of a downstream duct 7 which is downstream of the module 2 with respect to the air flow 5. The gates 8 are provided at six locations.

Therefore, a distance M between the lattice 4 and the gate 8 is set to the same distance as a total length L of the body.

Providing the gates 8 on the end face 7a of the downstream duct eliminates the necessity for providing the gates 8 inside the body 1, can eliminate air disturbance of the air flow 5 produced by gate traces and can thereby improve measurement accuracy of the air flow meter while simplifying the molding die structure.

Furthermore, the gates 8 are provided at six locations in this embodiment, but similar operations and effects can be obtained if there is at least one gate 8.

Here, an average thickness J of a reticular lattice 11 of the lattice 4 is set such that an average thickness of a minimum thickness 9a upstream of the air flow 5 and a maximum thickness 9b downstream thereof falls within a range of 0.3 to 0.6 mm. When, for example, the minimum thickness 9a of the reticular lattice 11 is approximately 0.3 mm and the maximum thickness 9b of the reticular lattice 11 is approximately 0.5 mm, the average thickness J of the reticular lattice 11 is (0.3+0.5)/2=approximately 0.4 mm. Furthermore, an average thickness K of the duct of the body 1 is preferably set to approximately 2.5 mm or more to maintain the strength. For example, a thickness K1 of a duct 7 downstream of the air flow 5 is approximately 3 mm and a duct thickness K2 of a duct 6 upstream thereof is approximately 7 mm and the average thickness K of the duct of the body 1 is (3+7)/2=approximately 5.0 mm.

Therefore, the relationship between the average thickness J of the reticular lattice and the average thickness K of the duct of the body 1 is 0.4:5.0, which is equivalent to 1:12.5; namely a thickness difference of approximately 13 times is set therebetween. Furthermore, the volume ratio of the lattice 4 to the duct of the body 1 is 1:23.9; namely a volume difference of approximately 24 times is set.

Adopting the above described configuration causes the respective plastics of the reticular lattice (average thickness J≈0.4) of the lattice 4 which is thin plastic and the body 1 (average thickness K≈4) which is thick plastic, having a thickness difference of approximately 13 times and a volume difference of approximately 24 times to be integrally molded and allows the distance M between the positions of the lattice 4 and the gate 8 to be made longer than half the total length L (length in an axial direction) of the body 1 satisfying the relationship of half the length of the body 1 L/2≦the distance M between the positions of the laminarization lattice and the gate. Furthermore, with respect to the air flow 5, the lattice 4 is placed upstream of the module 2 and the gate 8 is placed downstream thereof.

This allows integral molding of the lattice 4 which is thin plastic and the body 1 with the average thickness J of the reticular lattice 11 of the lattice 4 being approximately 0.4 mm, the thickness difference between the average thickness J of the reticular lattice 11 and the average thickness K of the duct of the body 1 being approximately 13 times and the volume difference between the body 1 and the lattice 4 being approximately 24 times.

That is, adopting the above described configuration fosters moldability of the reticular lattice 11 of the lattice 4, thereby eliminates the necessity for increasing the minimum thickness 9a of the lattice or the thickness of the maximum thickness 9b, and can thereby suppress an increase in pressure loss. It also eliminates the necessity for increasing the thickness of the lattice 4 and can eliminate the traces of the gates 8 inside the body 1, thereby suppress air disturbance, increase the laminarization effect and improve measurement accuracy of the air flow meter. Moreover, since integral molding is possible, secondary work such as assembly is no longer necessary and it is possible to eliminate deterioration of measurement accuracy of the air flow meter due to assembly variations, eliminate deterioration of measurement accuracy of the air flow meter due to assembly faults and also reduce the number of parts to thereby realize a cost reduction.

The operations and effects of the present invention will be explained more specifically based on FIGS. 5 to 7. FIG. 5 shows results indicating the relationship between an injection pressure and time when the positions of the gates 8 are changed in the body 1 where the lattice 4 having the reticular lattice 11 is provided inside the body 1, the lattice 4 is mounted at an end 6a of the upstream duct 6 of the body 1, and the lattice 4 and the body 1 are integrally molded. Furthermore, the results at this time are obtained in a configuration in which polybutylene terephthalate containing glass fibers is used, the number of gates 8 is four, an average thickness J of the reticular lattice 11 is 0.6 mm, an average thickness K of the duct of the body 1 is 5 mm, a thickness difference between the lattice 4 and the duct is approximately 8 times and a volume ratio is approximately 20 times. Repeating the explanation above, these are the results indicating the relationship between the injection pressure and time when the distance M between the positions of the lattice 4 and the gates 8 in the body 1 in which the body 1 and the lattice 4 are united is changed. Here, the positions of the gates 8 are as shown in FIG. 6 and FIG. 7, and FIG. 6 shows the positions of the gates 8 showing an embodiment of the present invention and the gates 8 are located on the end face 7*a* of the downstream duct 7 of the body 1 so that the distance M between the positions of the lattice 4 and the gate 8 becomes longer. Since this results in M=L, it is possible to satisfy the relationship of L/2≦M in the configuration of the body 1 in FIG. 6. FIG. 7 shows the positions of the gates 8 completely opposite to the positions of the gates 8 in FIG. 6 and the gates 8 are provided on the lattice 4. In this case, since M=0, a relationship of L/2>M is given in the body shape in FIG. 7, which does not satisfy the relationship of L/2≦M.

The relationship between the injection pressure and time shown in the result of FIG. 5 when M=0 at the positions of the gates 8 in FIG. 7 showing the case where the present invention is not used will be explained first. Resin starts to flow through the lattice 4 which is thin plastic provided with the gates 8. Therefore, since resin tries to flow through the thin part, the injection pressure increases immediately after molding ("a" shown in FIG. 5). The resin then flows through the mesh of the reticular lattice 11 of the lattice 4 freely in directions in which it can flow more easily. That is, the flow distance of resin flowing through the thin part increases and the resistance increases. This phenomenon causes the injection pressure to tend to drastically increase ("b" shown in FIG. 5). Part of the resin that has flown freely through the lattice 4 reaches the upstream duct 6 of the body 1 ("c" shown in FIG. 5) and then forms the duct part of the body 1. Since the duct part of the body 1 is thick compared to the lattice 4, the injection pressure during molding of this section has an increasing tendency more moderate than when the resin is flowing through the lattice 4 ("d" shown in FIG. 5).

Repeating the explanation above, the resin flows in any direction in which it can flow more easily and flows freely through the mesh of the reticular lattice 11 of the lattice 4. Therefore, when the resin which has molded the lattice 4 and flown therethrough reaches the upstream duct 6 of the body 1, the resin has not flown into the upstream duct 6 of the body 1 after completing the molding of all the mesh of the reticular lattice 11 of the lattice 4. That is, when the resin reaches the body 1 and starts to mold the upstream duct 6 of the body 1, some parts of the reticular lattice 11 of the lattice 4 remain unmolded. Here, the resin flows in any direction in which it can flow more easily. When the cross-sectional area of the average thickness K of the duct part of the body 1 is compared with the cross-sectional area of the average thickness J of the reticular lattice 11 of the lattice 4 which is thin plastic, the cross-sectional area of the duct part of the body 1 is greater. Therefore, the resin flows in the direction in which it molds the duct part of the body 1 more easily than the lattice 4. That is, after flowing through the reticular lattice 11 of the lattice 4 and reaching the body 1, the resin starts to mold the duct of the body 1 while leaving some unmolded parts of the reticular lattice 11 of the lattice 4 substantially as they are (resin does not flow into the unmolded parts of the lattice 4 so much). Since the resin is cooled and hardened to the temperature of the molding die with time, the resin remaining in the unmolded parts of the reticular lattice 11 of the lattice 4 is gradually hardened and solidified. Once solidified, even if the injection pressure is increased ("e" shown in FIG. 5), the resin no longer flows. In this way, the phenomenon that when the resin flows and reaches the upstream duct 6, even if the resin is still in a condition to continue to flow, the resin does not flow because of tradeoffs with shapes of other parts, remains at substantially the same location, the resin is solidified with time as is, producing shorted parts is called "hesitation."

Therefore, when the distance M between position of the lattice 4 on which the gates 8 are provided and the gates 8 is M=0 where the relationship of L/2>M is held, some parts of the reticular lattice 11 of the lattice 4 which is thin plastic are shorted due to hesitation and it is not possible to completely mold the shape.

This embodiment has been explained assuming the case where the average thickness J of the reticular lattice 11 of the lattice 4 is 0.6 mm, the average thickness K of the duct of the body 1 is 5 mm and the volume difference between the body 1 and lattice 4 is approximately 20 times, but the body 1 in which the average thickness J of the reticular lattice 11 of the lattice 4 is 0.3 to 0.6 mm and the lattice is integrally molded with the body 1 also has similar operations and it is not possible to mold the lattice 4 which is thin plastic.

Next, the relationship between the injection pressure and time shown in the result in FIG. 5 when M=L at the positions of the gates 8 in FIG. 6 showing the case where the embodiment of the present invention is used will be explained. The configuration of the body 1 is the same as that in FIG. 7, while the difference is in the positions of the gates 8 and the distance between the gates 8 and the lattice 4 is M.

The resin starts to flow through the downstream duct 7 of the body which is the thick part. Since the resin flows through the downstream duct 7 of the body which is the thick part, the injection pressure immediately after molding shows a moderate increasing tendency ("f" shown in FIG. 5). The resin then flows into the upstream duct 6. The resin which has started to flow through the gates 8 molds the upstream duct 6 and flows into the lattice 4. At the time the resin starts to flow into the lattice 4 which is thin plastic, the injection pressure increases drastically ("g" shown in FIG. 5). The injection pressure reaches a maximum pressure when the lattice 4 is filled ("h" shown in FIG. 5).

Here, when the resin flows through the lattice 4, the resin flows from the entire circumference of the upstream duct 6 of the body 1 into the lattice 4. This is because when the cross-sectional area of the average thickness K of the duct part of the body 1 is compared with the cross-sectional area of the average thickness J of the reticular lattice 11 of the lattice 4 which is thin plastic, the cross-sectional area of the duct part of the body 1 is greater and because the resin flows in any direction in which it can flow more easily. That is, when the resin is about to start to flow into the lattice 4 which is thin plastic, even if there are some unmolded parts in the upstream duct 6, the resin flows through the unmolded parts in the upstream duct 6 where it can flow more easily and molds the upstream duct. This is because the resin then starts to flow into the lattice 4 which is thin plastic. Furthermore, since the resin advances while spreading in any direction in which it can flow more easily, at about the time the resin flows into the upstream duct 6 from the downstream duct 7, the resin has spread over the entire circumference to a certain degree. Therefore, after molding a large proportion of the upstream duct 6, the resin molds the lattice 4 which is thin plastic from the entire circumference of the upstream duct 6 and continues to flow while drastically increasing the injection pressure. That is, the reticular lattice 11 of the lattice 4 which is thin plastic can be molded from the circumference of the lattice 4 toward the center. Adopting this configuration eliminates a large proportion of unmolded parts of the duct which is the thick part when the resin molds the reticular lattice 11 of the lattice 4 which is thin plastic so as to use a large proportion of the injection pressure during molding to mold the reticular lattice 11 of the lattice 4. Furthermore, the flow of resin when molding the reticular lattice 11 of the lattice 4 is a direction from the circumference to the center of the lattice 4, and moreover the resin is made to flow from substantially the entire circumference to the center of the lattice 4. Therefore, adopting the configuration of the present invention causes resin which flows freely in any direction in which it can flow more easily to flow through the reticular lattice 11 of the lattice 4 which is thin plastic, that is, allows the resin to be oriented in one direction during molding and allows a large proportion of the injection pressure to be used to mold the lattice 4. That is, adopting the configuration of the present invention allows resin to flow in one direction from the circumference to the center when molding the reticular lattice 11 of the lattice 4 which is thin plastic, allows a large proportion of the resin pressure to be used to fill the lattice 4 and allows the reticular lattice 11 of the lattice 4 to be filled with resin at a stroke in a short time, in other words, allows the resin to be pushed in at a stroke in a short time ("i" shown in FIG. 5).

Therefore, when the gates 8 are provided on the end 7a of the downstream duct 7 and the distance M between the positions of the lattice 4 and the gates 8 is M=L in the relationship of $L/2 \leq M$, it is possible to mold the reticular lattice 11 of the lattice 4 which is thin plastic without provoking hesitation.

This embodiment has been explained assuming the case where the average thickness J of the reticular lattice 11 of the lattice 4 is 0.6 mm, the average thickness K of the duct of the body 1 is 5 mm and the volume difference between the body 1 and the lattice 4 is approximately 20 times, but it is also possible to mold the lattice 4 which is thin plastic having similar operations even in the body 1 with which the lattice 4 is integrally molded with the average thickness J of the reticular lattice 11 of the lattice 4 being 0.3 to 0.6 mm.

Furthermore, this embodiment has explained the case using polybutylene terephthalate containing glass fibers, but similar operations and effects may also be obtained with resin such as PA and PPS having similar thermal resistance and strength.

The operations and effects of the present invention will be explained more specifically based on FIG. 8 and FIG. 9. FIG. 8 shows results of an injection pressure when the positions of the gates 8 are changed in the shape of the body 1 with which the lattice 4 is integrally molded, that is, results indicating the relationship between the distance M between the positions of the gates 8 and lattice 4, and the injection pressure. Furthermore, it also shows a result when polybutylene terephthalate containing glass fibers is used. The graph shows simulation results near the end of molding (state in which resin is flowing).

In the shape of the body 1 in this result, the lattice 4 is mounted at the end of the upstream part of the upstream duct 6 of the body 1. Furthermore, the reticular lattice 11 of the lattice 4 is thin plastic whose average thickness J of the minimum thickness 9-a and maximum thickness 9-b is 0.4 mm. Furthermore, the duct of the body 1 is thick plastic whose average thickness K is 5 mm and the volume difference between the lattice 4 and the duct of the body 1 is approximately 20 times. In the configuration of the above described body 1, the gates 8 to be evaluated are located as shown in FIG. 9 and the distance M between the positions of the laminarization lattice and the gates is M=0, L/8, L/4, L/2, L×3/4, L×7/8 and L respectively.

Here, when the distance M between the positions of the lattice 4 and the gates is M=0, L/8 and L/4, there is a relationship of $L/2 > M$ and when M=L/2, L×3/4, L×7/8, L, there is a relationship of $L/2 \leq M$. Therefore, the configuration when M=L/2, L×3/4, L×7/8, L shows the configuration of the present invention.

First, a case where the present invention is not used will be explained. A case where the distance M between the positions of the lattice 4 and the gates 8 is M=0 will be explained. As already explained in FIGS. 5 to 7, the explanation above is repeated, and since resin flows from the lattice 4 which is thin plastic to the upstream duct 6 of the body 1, the injection pressure increases. Furthermore, shorting occurs in part of the reticular lattice 11 of the lattice 4 which is thin plastic due to hesitation and it is not possible to mold the lattice 4.

Next, M=L/8, L/4 will be explained. Since resin hardly flows through the reticular lattice 11 of the lattice 4 which is thin plastic, the injection pressure lowers extremely. In the configuration of this example, when compared with the injection pressure according to the embodiment of the present invention whereby the lattice 4 can be molded, the injection pressure is approximately ⅓ times. However, since shorting occurs in a large proportion of the reticular lattice 11 of the lattice 4 due to hesitation, that is, a large proportion of the reticular lattice 11 of the lattice 4 is not molded, the lattice 4 cannot be molded.

The flow of resin which has flown from the gates 8 of the upstream duct 6 of the body 1 will be explained. Resin j that has flown from the gates 8 flows in the upstream and downstream directions of the duct. The resin that has flown in the direction of the upstream duct 6 flows up to the point at which the lattice 4 which is thin plastic is mounted. Here, when the cross-sectional area of the average thickness J of the reticular lattice 11 of the lattice 4 which is thin plastic is compared with the cross-sectional area of the average thickness K of the duct of the upstream duct 6, the cross-sectional area of the average thickness K of the upstream duct 6 is greater, and therefore the resin flows in the direction in which the unmolded part of the upstream duct 6 is molded, which is the direction in which the resin can flow more easily and the upstream duct 6 is molded. When the resin flowing through the downstream duct when molding of the upstream duct 6 is finished is observed, since there is a relationship between the distance between the gate position and the end face of the upstream duct 6 < the distance between the gate position and the end face of the downstream duct 7, even when molding of the upstream duct 6 is finished, when, for example, the distance M between the lattice 4 and the gates 8 is M=L/8, the downstream duct 7 remains unmolded in a large proportion of the range such that the length of substantially 3/4×L of the downstream duct 7 is unmolded. The lattice 4 which is thin plastic provided in the direction of the upstream duct 6 is also unmolded. That is, when the upstream duct 6 is molded, the lattice 4 provided in the upstream duct 6 and the downstream duct 7 remain as unmolded ranges. Here, when the cross-sectional area of the average thickness J of the reticular lattice 11 of the lattice 4 which is unmolded part is compared with the cross-sectional area of the duct average thickness K of the downstream duct 7, the cross-sectional area of the downstream duct 7 is greater, and therefore a large proportion of the resin flows in the direction in which the downstream duct 7 is molded. That is, the resin flows in such a way that the downstream duct 7 is molded while the lattice 4 which is thin plastic remains unmolded. That is, at this time, the lattice 4 which is thin plastic has provoked hesitation. Therefore, the resin flowing in the vicinity of the lattice 4 which has provoked hesitation mostly remains as is without flowing, and therefore when molding of the downstream duct 7 is finished, the resin is cooled due to the temperature difference from the temperature of the molding die and solidified. Therefore, the resin cannot flow into the lattice 4 and remains unmolded with most of the lattice 4 being substantially shorted.

Therefore, in the gate position at this time, the reticular lattice 11 of the lattice 4 which is thin plastic cannot be molded.

Hereinafter, the case where the present invention is used will be explained. First, a case where M=L/2, that is, the distance M between the lattice 4 and the gates 8 is half the entire length L of the body will be explained.

As explained in FIGS. 5 to 7, adopting this configuration allows resin to be pushed into the reticular lattice 11 of the lattice 4 at a stroke in a short time and allows the reticular lattice 11 to be molded.

The resin which has flown from the gates 8 provided in the center of the duct L of the body 1 flows in upstream and downstream directions of the duct. Here, since the distance between the positions of the gates 8 and the end face of the upstream duct 6≈the distance between the positions of the gates 8 and the end face of the downstream duct 7, molding of the upstream duct 6 and molding of the downstream duct 7 are finished at substantially the same time. At this time, what remains unmolded is only the lattice 4 which is thin plastic, and therefore a large proportion of the injection pressure of the resin can be used as a force of flowing into the lattice 4. Furthermore, when attention is focused on the resin of the lattice 4 which is thin plastic, unmolded at this time, the resin advances in the upstream and downstream directions while spreading on the circumference of the duct, while flowing through the duct part of the body 1. By about the time the resin flows up to the vicinity of the end of the upstream duct 6 in which the lattice 4 is provided, the resin has spread on substantially the entire circumference of the upstream duct 6. Next, the lattice 4 remains unmolded and this is because the resin has not reached the lattice 4, and therefore the resin has molded substantially all the upstream and downstream ducts 6 and 7 and the resin which has reached the lattice 4 is in a viscous state (fountain flow state). In other words, the unmolded resin of the lattice 4 does not remain without flowing though the resin has reached the lattice 4 as in the case of M=0, L/8, L/4 explained above. That is, the temperature of the resin in the vicinity of the lattice 4 has not lowered so much and is in a viscous state.

Therefore, it is possible to push the resin into the reticular lattice 11 of the lattice 4 which is thin plastic from substantially the entire circumference of the lattice 4 to the center at a stroke in a short time.

Furthermore, since the lattice 4 which is thin plastic is pushed in at a stroke in a short time, the injection pressure becomes higher than the cases where M=L/8, L/4 when the lattice 4 is shorted. In this configuration, the injection pressure is higher by approximately 3 times. However, the lattice 4 which is thin plastic can be molded at an injection pressure lower than that in the case where M=0 when the gates are on the lattice 4.

Next, the case where the distance M between the lattice 4 and the gates 8 is M=L×3/4, L×7/8 will be explained. As explained in FIGS. 5 to 7, adopting this configuration makes it possible to push resin into the reticular lattice 11 of the lattice 4 at a stroke in a short time and mold the reticular lattice 11.

The resin flowing from the gates 8 provided in the downstream duct 7 of the body 1 flows in the upstream and downstream directions of the duct. Here, since there is a relationship of the distance between the positions of the gates 8 and the end face of the upstream duct 6>the distance between the positions of the gates 8 and the end face of the downstream duct 7, even when molding of the downstream duct 7 is finished, the upstream duct 6 remains unmolded. For example, when the distance M between the lattice 4 and the gates 8 is M=L×7/8, the upstream duct 6 remains unmolded in a large proportion of the range such that the portion of the upstream duct 6 corresponding to a length of substantially 3/4×L is unmolded. Therefore, the resin does not flow up to the lattice 4 which is thin plastic mounted on the end face of the upstream duct 6. After molding of the downstream duct 7 is finished, the resin flows while spreading on the circumference in a direction in which the upstream duct 6 provided with the lattice 4 which is thin plastic is molded. Therefore, it is possible to mold the reticular lattice 11 of the lattice 4 which is thin plastic as explained in FIGS. 5 to 7. Repeating the explanation above, it is possible to push in resin at a stroke in a short time to mold the lattice 4 which is thin plastic. Furthermore, since the lattice 4 which is thin plastic is pushed in at a stroke in a short time, the injection pressure becomes higher than that the cases where M=L/8, L/4 when the lattice 4 is shorted. In this configuration, the injection pressure is higher approximately 3 times. However, it is possible to mold the reticular lattice 11 of the lattice 4 which is thin plastic at an injection pressure lower than that when M=0 where the gates are on the lattice 4.

M=L will be explained. This is a repetition of the explanation in FIGS. 5 to 7, but adopting the above described configuration allows a large proportion of the injection pressure to be used to mold the reticular lattice 11 of the lattice 4 which is thin plastic, makes the resin flow in one direction from the circumference to the center of the lattice 4 and allows the resin to be flown from the entire circumference of the lattice 4 to the center of the lattice 4. This allows the reticular lattice 11 of the lattice 4 which is thin plastic to be pushed in at a stroke in a short time. Furthermore, since the lattice 4 which is thin plastic is pushed in at a stroke in a short time, the injection pressure becomes higher than that in the cases where M=L/8, L/4 when the lattice 4 is shorted. According to this configuration, the injection pressure is higher approximately 3 times. However, it is possible to mold the lattice 4 which is thin plastic at an injection pressure lower than that in the case where M=0 when the gates are on the lattice 4.

This embodiment has explained the case using polybutylene terephthalate containing glass fibers, but similar operations and effects are also obtained using resin such as PA, PPS having similar thermal resistance and strength.

Figure 10:
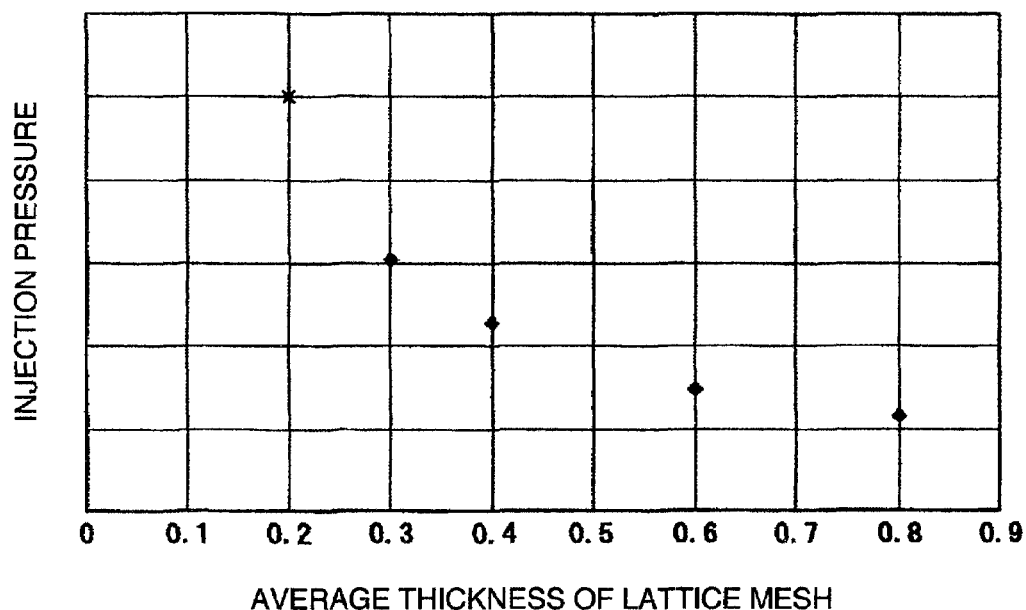
FIG. 10 illustrates a relationship between an average thickness of the reticular lattice and an injection pressure showing the embodiment of the present invention.

FIG. 10 shows a result of injection pressure when the average thickness J of the minimum thickness 9a and the maximum thickness 9b of the reticular lattice 11 of the lattice 4 in the shape of the body 1 with which the lattice 4 is integrally molded is changed, that is, a result indicating the relationship between the average thickness J of the reticular lattice 11 of the lattice 4 and the injection pressure. Furthermore, it is also a result when polybutylene terephthalate containing glass fibers is used.

The shape of the body 1 in this result has a configuration in which the lattice 4 is provided at the upstream end 6a of the upstream duct 6 of the body 1 and the lattice 4 and the duct of the body 1 are integrally molded. Furthermore, the gates 8 are provided at four locations of the downstream end 7a of the downstream duct 7, the relationship between the distance M between the positions of the lattice 4 and the gates 8, and the total length L of the body is M=L, which satisfies the relationship of L/2≦M. In the configuration of the above described body 1, cases where the average thickness J of the minimum thickness 9a and maximum thickness 9b of the reticular lattice 11 of the lattice 4 is J=0.2 mm, 0.3 mm, 0.4 mm, 0.6 mm and 0.8 mm are shown.

In the case where a body configuration in which the relationship between the distance M between the lattice 4 and the gates 8, and the total length L of the body is L/2≦M is adopted, when the average thickness J of the reticular lattice 11 is 0.2, it is not possible to mold the reticular lattice 11 of the lattice 4 which is thin plastic. That is, even if the configuration in which the lattice 4 is filled with resin or resin is pushed into the lattice 4 at a stroke in a short time is adopted, the reticular lattice 11 cannot be molded.

The operations and effects of the present invention are to enable resin to be flown and realize integral molding of thick plastic and thin plastic without provoking hesitation in the lattice 4 in integral molding of the body 1 and the lattice 4 having a large thickness difference and volume difference. Therefore, in the operations and effects of the present invention, there is a range of lower limit to the average thickness J of thin plastic within which molding is possible.

The lower limit of moldability to the average thickness J of the reticular lattice will be explained. The behavior of resin (melted material) which flows inside a molding die undergoes processes of flow, cooling and solidification. Furthermore, resin flows in a fountain flow state, moves to the wall surface of the molding die while cooling. In other words, resin flows and molds while solidifying the surface of resin due to the temperature difference between the temperature of resin and the temperature of the molding die. Therefore, the smaller the average thickness J of the reticular lattice 11 of the lattice 4 which is thin plastic and the greater the flow distance, the more the resin is cooled and the greater the solidification layer of the resin becomes. Therefore, as the reticular lattice 11 of the lattice 4 becomes thinner, it becomes harder for the resin to flow through the reticular lattice 11. Because of the above described phenomenon, the injection pressure becomes extremely higher as the average thickness of the reticular lattice 11 decreases as shown in FIG. 10. Therefore, to realize moldability in this embodiment, the average thickness J of the reticular lattice 11 is preferably 0.3 mm or more. Based on the graph or a prototype, the lower limit value is estimated to be in the vicinity of 0.25 mm between 0.2 mm and 0.3 mm.

The embodiment has explained the case using polybutylene terephthalate containing glass fibers, but similar operations and effects are obtained also using resin such as PA and PPS having similar thermal resistance and strength.

Figure 11:
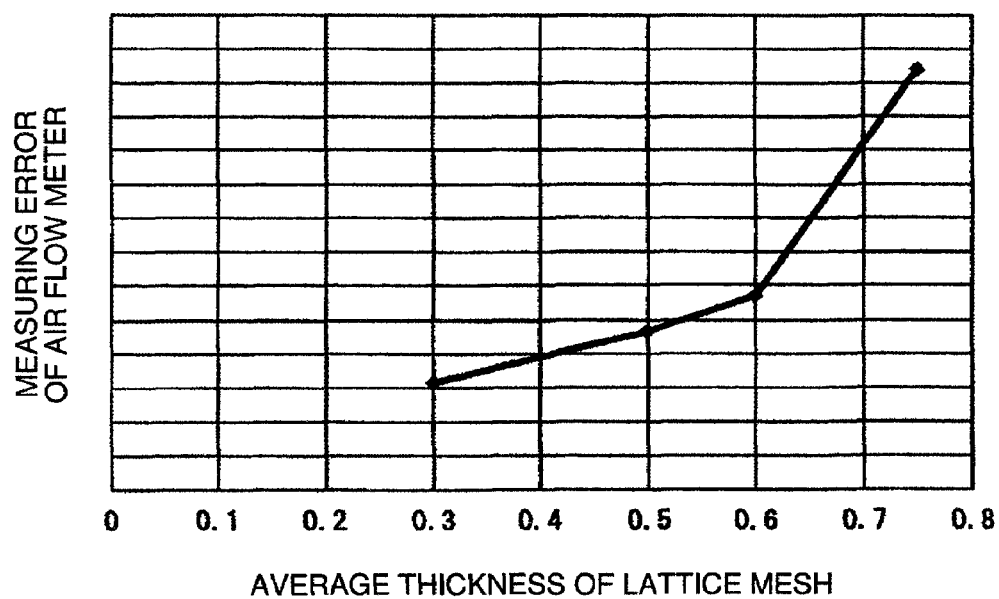
FIG. 11 illustrates an average thickness of the reticular lattice and measurement accuracy of the air flow meter showing the embodiment of the present invention.

FIG. 11 shows a result of indicating the average thickness J of the reticular lattice 11 of the lattice 4 and measurement accuracy of the air flow meter. The measurement accuracy of the air flow increases as the average thickness J of the reticular lattice 11 decreases. On the contrary, the measurement accuracy deteriorates as the average thickness J of the reticular lattice 11 increases. A cause for the deterioration of measurement accuracy is that as the average thickness J of the reticular lattice 11 increases, the thickness of the reticular lattice 11 becomes an obstacle to the air flow and exfoliation vortex is generated, provoking air disturbance. Therefore, to maintain measurement accuracy, the average thickness J of the reticular lattice 11 having a relatively small proportion of accuracy deterioration is preferably 0.6 mm or less.

The configuration of the present invention allows integral molding of the body 1 which is a thick plastic part and the lattice 4 which is thin plastic and fosters molding of the reticular lattice 11 of the lattice 4, thereby eliminates the necessity for providing a thick lattice in the reticular lattice 11, and can thereby suppress an increase in pressure loss and suppress deterioration in measurement accuracy of the air flow meter due to air disturbance. Furthermore, by reducing the number of parts, it is possible to suppress a cost increase, eliminate secondary work of assembly and thereby eliminate degradation or deterioration of measurement accuracy of the air flow meter due to assembly variations and faults.

Figure 12:
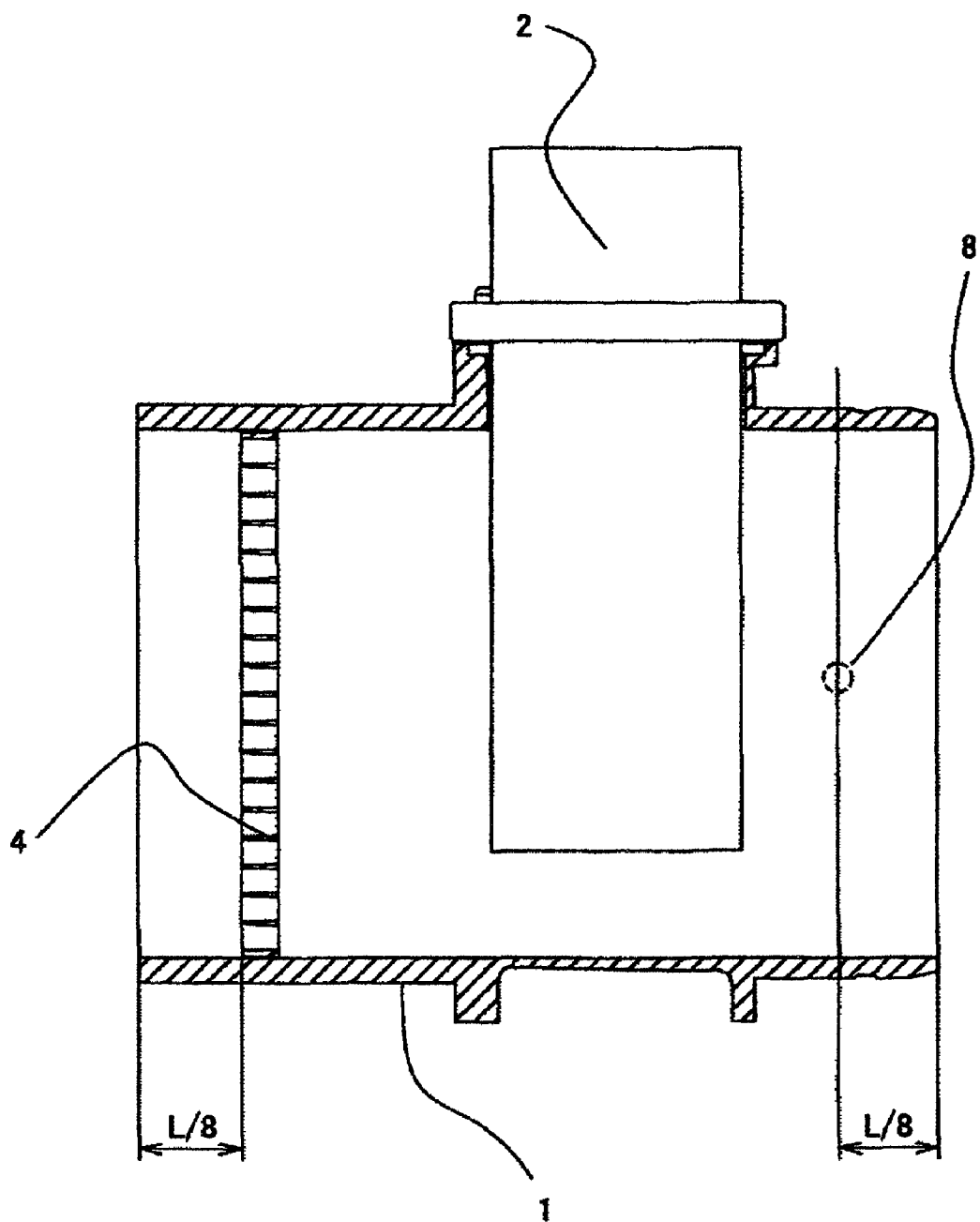
FIG. 12 is a cross-sectional view corresponding to the A-A cross-sectional view in FIG. 1 of the air flow meter showing another embodiment of the present invention.

FIG. 12 shows an A-A cross-sectional view of the air flow meter in FIG. 1 showing another embodiment of the present invention. A lattice 4 is mounted at a distance corresponding to an offset of 1/8 times the total length L of a body from the end face of an upstream duct 6 of the body 1. Furthermore, a gate is located at a distance corresponding to an offset of 1/8 times the total length L of the body from the end face of a downstream duct 7.

In the above described configuration, the laminarization lattice 4 and the gate are arranged inside the ends of the body, and a distance M between the lattice 4 and the gate is a distance of 3/4×L with respect to the total length of the body, which satisfies a relationship of $L/2 \leq M$. Adopting this configuration makes it possible to obtain operations and effects similar to those explained in FIGS. 1 to 9 and push in resin at a stroke in a short time to mold a reticular lattice 11 of the lattice 4 which is thin plastic.

Figure 13:
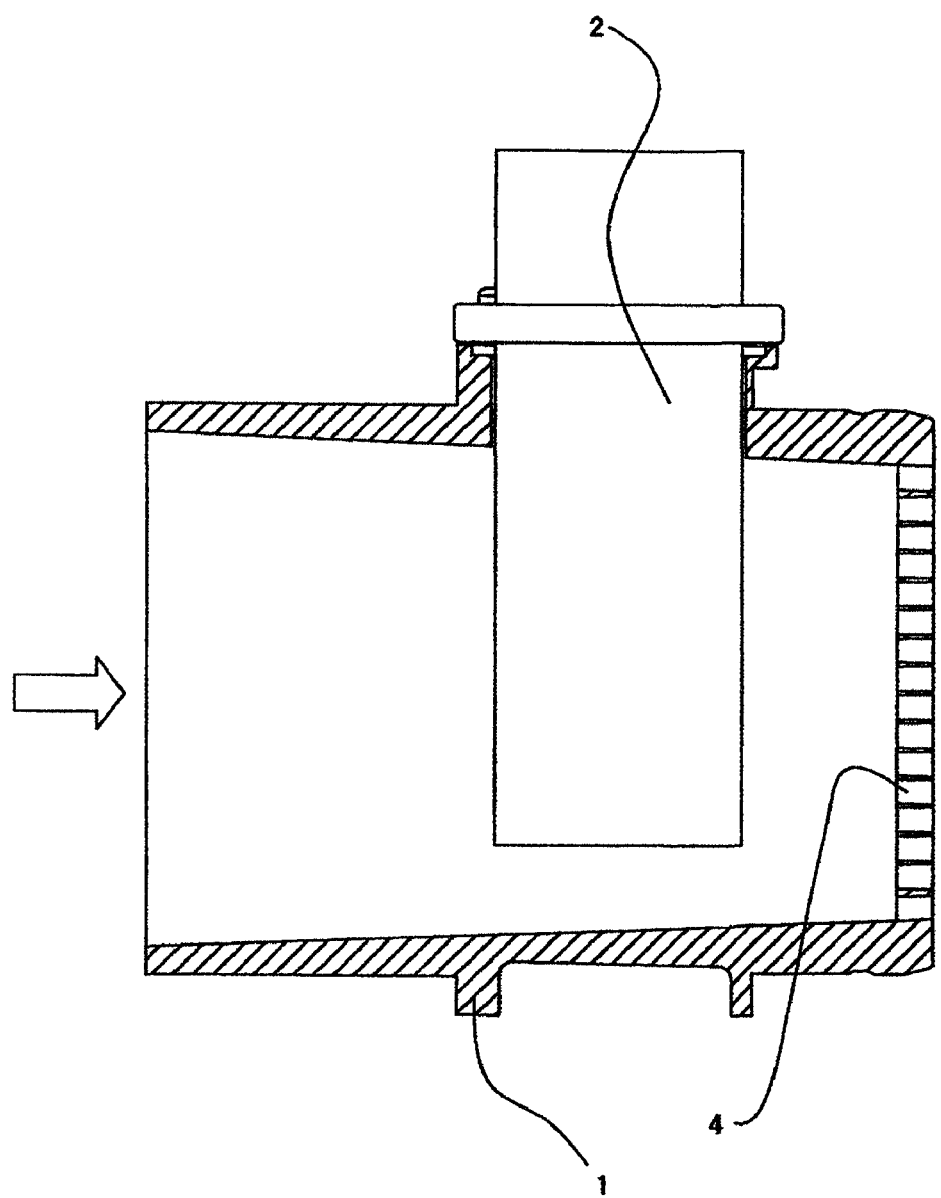
FIG. 13 is a cross-sectional view corresponding to the A-A cross-sectional view in FIG. 1 of the air flow meter showing a further embodiment of the present invention.

FIG. 13 shows an A-A cross-sectional view of the air flow meter in FIG. 1 showing a further embodiment of the present invention.

This embodiment adopts a configuration in which a lattice 4 is disposed downstream of a module 2 having a sensing element which detects an air flow, a gate is provided on an end face upstream of the module 2 on the opposite side thereof so as to satisfy a relationship of $L/2 \leq M$ and integrally molded with a body 1.

Even when the lattice 4 is disposed downstream of the module 2 as in the case of this configuration, providing gates 8 on a side opposite to the module allows operations and effects similar to those explained in FIG. 1 to FIG. 12.

Figure 14:
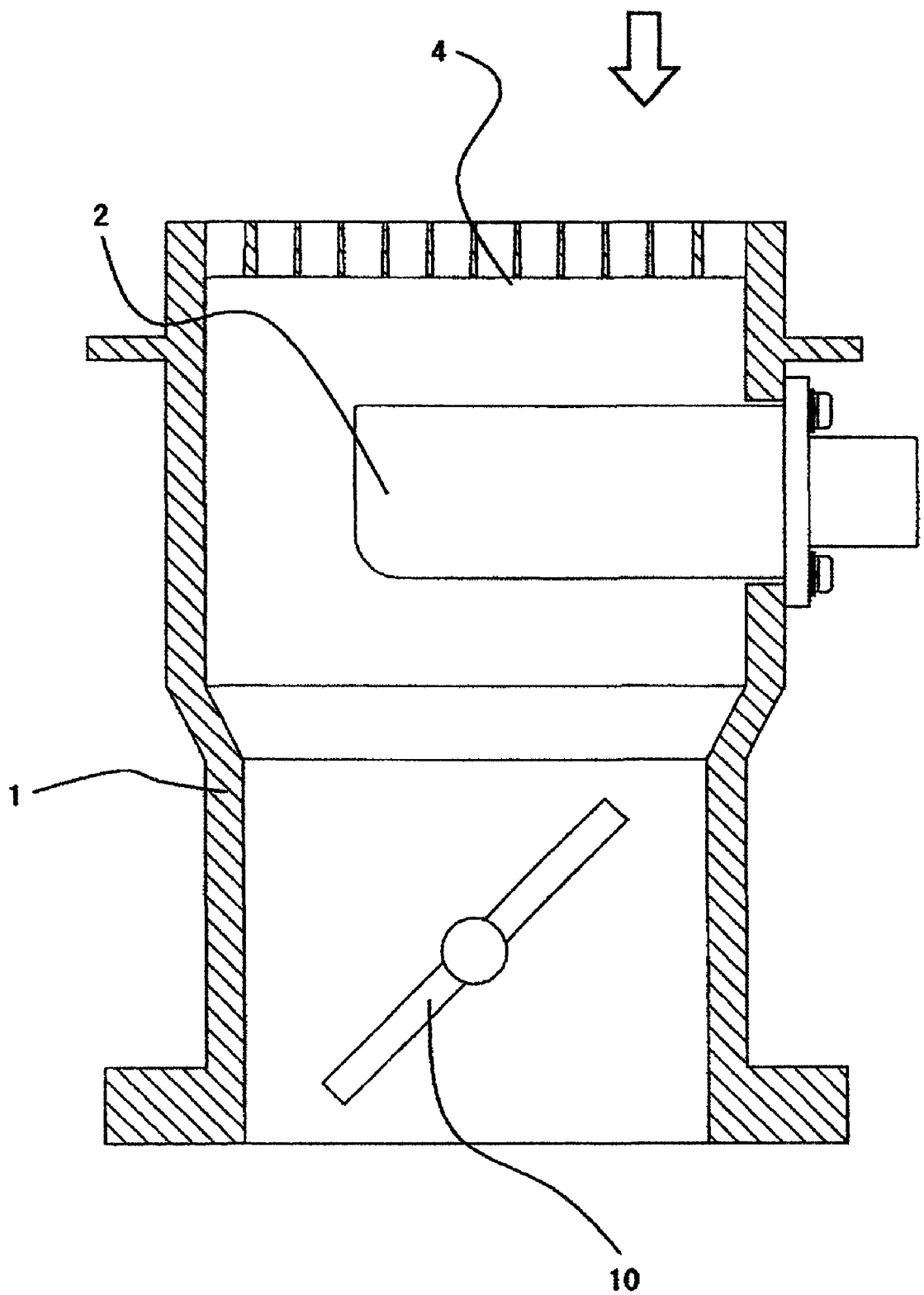
FIG. 14 is a cross-sectional view corresponding to the A-A cross-sectional view in FIG. 1 of the air flow meter showing a still further embodiment of the present invention.

FIG. 14 shows an A-A cross-sectional view of the air flow meter shown in FIG. 1 showing a still further embodiment of the present invention.

This embodiment is the same as the embodiments shown in FIGS. 1 to 12 and adopts a configuration in which the lattice 4 is disposed upstream of a module 2 having a sensing element which detects an air flow, the relationship between a distance M between the positions of the lattice 4 and gates 8, and a total length L of a body satisfies a relationship of $L/2 \leq M$ and the body 1 including a valve 10 which adjusts the air flow is integrally molded with the lattice 4.

Disposing the body 1 having the valve 10 as in the case of this configuration also allows operations and effects similar to those explained in FIGS. 1 to 11 to be obtained.

Figure 15:
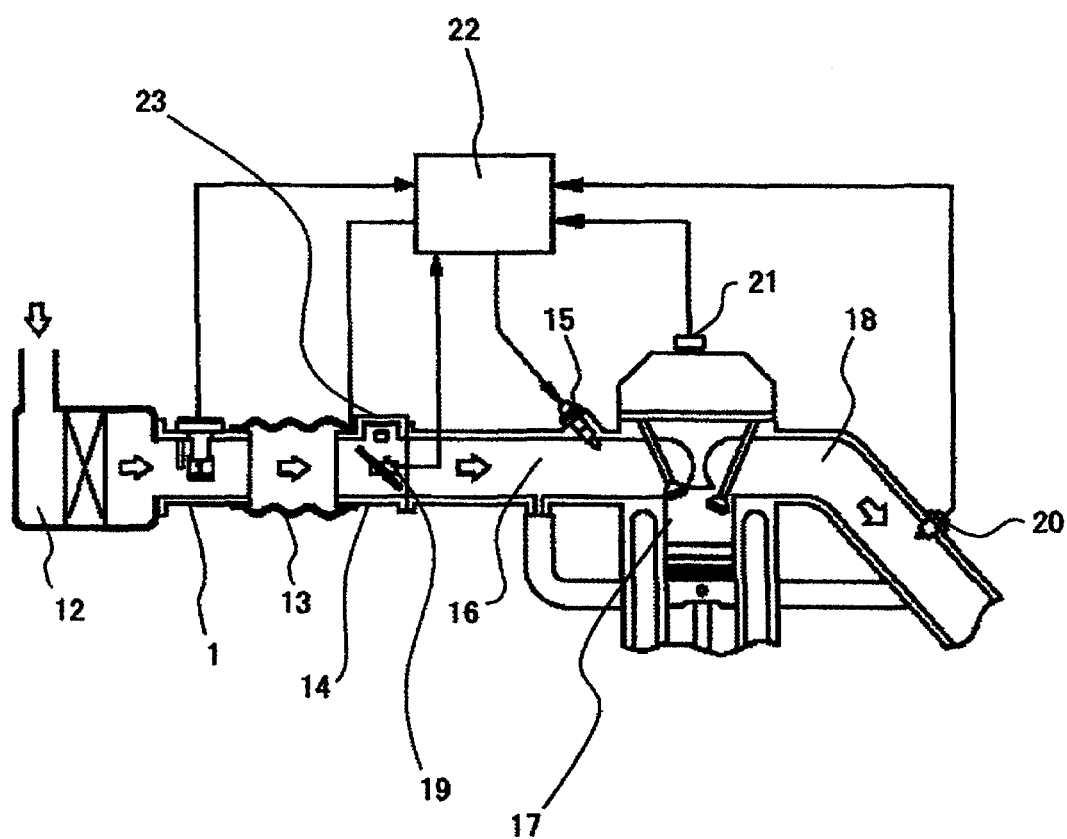
FIG. 15 shows an embodiment of an automotive air intake system layout using the air flow meter showing the embodiment of the present invention.

FIG. 15 shows an embodiment where the present invention is applied to an internal combustion engine using the air flow meter showing the embodiment of the present invention without any electronic injection scheme.

Air suctioned from an air cleaner 12 is passed through an intake manifold 16 provided with the body 1 of the air flow meter, an air intake duct 13, a body 14 having a throttle and an injector 15 to be supplied with fuel and taken into an engine cylinder 17. On the other hand, a gas generated in the engine cylinder 17 is exhausted through an exhaust manifold 18. A control unit 22 which receives an air flow signal outputted from an electronic circuit of the air flow meter, a throttle valve signal outputted from a throttle angle sensor 19, an oxygen concentration signal outputted from an air/fuel ratio sensor 20 mounted in the intake manifold and a rotation angle signal outputted from an engine speed sensor 21 as inputs calculates these signals and controls an optimum amount of fuel injection and an idle air control valve 23. The air flow meter is the same as the embodiments shown in FIGS. 1 to 14 and has a structure whereby similar operations and effects can be expected.

The present invention relates to an air flow meter and is particularly suitable for use in an air flow meter for measuring an air flow taken into an internal combustion engine of an automotive engine.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A flow meter comprising,
a passage forming body including a passage,
a lattice arranged at one of an inlet side and an outlet side of the passage forming body to extend across the passage, and
a flow rate measuring module for receiving a gaseous matter to measure a flow rate, a part of which flow rate measuring module extends into the passage through a hole of the passage forming body,
wherein the passage forming body and the lattice are monolithic with each other to be made of a resin through an injection molding,
the passage forming body includes at least one gate trace through which the resin forming the passage forming body and the lattice passed during the injection molding,
an axial distance between the gate trace and an end of the passage forming body adjacent to the one of the inlet side and the outlet side being not less than L/2 when L is an axial length of the passage, and
an average thickness of the lattice is not less than 0.3 mm and not more than 0.6 mm.

2. The flow meter according to claim 1, wherein the lattice is as sort of mesh, and a radial thickness of the tubular passage forming body at each of inlet and outlet thereof is not less than 2.5 mm.

3. The flow meter according to claim 1, wherein the passage forming body includes a plurality of the gate traces whose total number is not less than 4, and the resin includes PBT and glass fiber.

4. The flow meter according to claim 1, wherein the lattice is axially inwardly distant from the end of the passage forming body by L/8.

5. The flow meter according to claim 1, wherein the end of the passage forming body is to be connected fluidly to an air-intake path of an internal combustion engine.

6. A method for producing a flow meter having a passage forming body including a passage, and a flow rate measuring module for receiving a gaseous matter through an inlet thereof to measure a flow rate, comprising the steps of:
injecting a resin through a gate into a molding die with a first pressure to form the passage forming body including the passage and an inserting hole,
injecting the resin through the gate into the molding die with a second pressure higher than the first pressure to form monolithically with the passage forming body a lattice extending across the passage, and
inserting an inlet of the flow rate measuring module through the inserting hole into the passage to fix the flow rate measuring module to the passage forming body.

7. The method according to claim 6, wherein the first pressure is increased in accordance of a time elapse, and the second pressure is increased in a rate higher than an increasing rate of the first pressure with respect to the time elapse.

8. A flow rate measuring passage tube comprising a passage forming body including a passage, and a lattice arranged at one of an inlet side and an outlet side of the passage forming body to extend across the passage, the passage forming body including a hole for receiving therein a part of a flow rate measuring module for receiving a gaseous matter to measure a flow rate,
wherein the passage forming body and the lattice are formed monolithically with each other by a resin, and
the passage forming body includes at least one gate trace through which the resin forming the passage forming body and the lattice passed during the injection molding, an axial distance between the gate trace and an end of the passage forming body adjacent to one of inlet side and outlet side at which the lattice is arrange being not less than L/2 when L is an axial length of the passage, and
an average thickness of the lattice is not less than 0.3 mm and not more than 0.6 mm.

9. The flow rate measuring passage tube according to claim 8, wherein the lattice is as sort of mesh, and a radial thickness of the tubular passage forming body at each of inlet and outlet thereof is not less than 2.5 mm.

10. A method for producing a flow rate measuring passage tube into which a part of a flow rate measuring module for receiving a gaseous matter to measure a flow rate is capable of being inserted, comprising the steps of:
injecting a resin through a gate into a molding die with a first pressure to form a passage forming body including a passage and an inserting hole for receiving therein the part of the flow rate measuring module, and
injecting the resin through the gate into the molding die with a second pressure higher than the first pressure to form monolithically with the passage forming body a lattice extending across the passage.

11. The method according to claim 10, wherein the first pressure is increased in accordance of a time elapse, and the second pressure is increased in a rate higher than an increasing rate of the first pressure with respect to the time elapse.

12. An air flow meter for measuring a flow rate of an air for an internal combustion engine, comprising,
an air passage forming member including an air passage to measure the flow rate of the air flowing through the air passage, and a lattice arranged in the air passage forming member to be positioned at one of upstream side and downstream side with respect to a flow rate sensor, wherein the lattice forms mesh in the air passage, an average thickness of the mesh as an average value of maximum and minimum thicknesses of the mesh is 0.25-0.6 mm, the lattice and the air passage forming member are monolithic with respect to each other, an axial distance between the lattice and a gate trace through which a resin forming the air passage forming member passed is not less than a half of an entire axial length of the air passage forming member.

13. The air flow meter according to claim 12, wherein the gate trace is arranged at an axial end of the air passage forming member.

14. The air flow meter according to claim 12, wherein the lattice and the air passage forming member are formed monolithically with each other by a material including glass and PBT resin.

15. An air flow meter for measuring a flow rate of an air for an internal combustion engine, comprising,
an air passage forming member including an air passage to measure the flow rate of the air flowing through the air passage, and a lattice arranged in the air passage forming member to be positioned at one of upstream side and downstream side with respect to a flow rate sensor, wherein the lattice forms mesh in the air passage, an average thickness of the mesh as an average value of maximum and minimum thicknesses of the mesh is 0.25-0.6 mm, the lattice and the air passage forming member are monolithic with respect to each other, a gate trace through which a resin forming the air passage forming member passed is arranged at the other side of the air passage forming member opposite to the one of the upstream side and the downstream side.

16. The air flow meter according to claim 15, wherein the gate trace is arranged at an axial end of the air passage forming member.

17. The air flow meter according to claim 15, wherein the lattice and the air passage forming member are formed monolithically with each other by a material including glass and PBT resin.

18. An air flow meter comprising,
a flow rate sensor for measuring a flow rate of an air to be taken into an internal combustion engine, a body having one of round shape and elliptical shape and forming a main air passage of the air, and a lattice arranged at one of upstream side and downstream side with respect to the flow rate sensor, wherein the lattice forms mesh in the body, an average thickness of the mesh as an average value of maximum and minimum thicknesses of the mesh is 0.25-0.6 mm, the lattice and the body are formed monolithically with each other by a material including glass and PBT resin, wherein an axial distance between the lattice and a gate trace through which the material passed is not less than a half of an entire axial length of the body.

19. An flow meter for measuring a flow rate of a gaseous matter, comprising,
a tubular member including a first through hole extending in an axial direction of the tubular member so that the gaseous matter flows through the first through hole,
a flow rate sensor extending at least partially into the first through hole to measure the flow rate, and
a lattice arranged in the tubular member and forming a plurality of second through holes extending in the axial direction and facing to the first through hole in the axial direction,
wherein the tubular member has a gate trace through which a resin forming the tubular member and the lattice monolithically with each other passed during a molding process for forming the tubular member and the lattice, and the gate trace is prevented from arranged on the lattice.

20. A method for producing an flow meter member having a tubular member including a first through hole extending in an axial direction of the tubular member so that a gaseous matter whose flow rate is to be measured flows through the first through hole, and a lattice arranged in the tubular member and forming a plurality of second through holes extending in the axial direction and facing to the first through hole in the axial direction, comprising the steps of:
injecting a resin through a molding die gate facing to a first molding die cavity corresponding to the tubular member so that the resin reaches the first molding die cavity before reaching a second molding die cavity corresponding to the lattice, and
injecting further the resin through the molding die gate and the first molding die cavity into the second molding die cavity.

* * * * *